United States Patent [19]

Ohno et al.

[11] Patent Number: 4,960,986
[45] Date of Patent: Oct. 2, 1990

[54] DEVICE AND METHOD FOR DETECTING A FOCUSING STATE WITH RELIABILITY CHECKING

[75] Inventors: Yoshimi Ohno, Kawasaki; Takayuki Hatase, Fukuoka, both of Japan

[73] Assignee: Ricoh Company, Ltd., Tokyo, Japan

[21] Appl. No.: 404,568

[22] Filed: Sep. 8, 1989

[30] Foreign Application Priority Data

Sep. 13, 1988 [JP] Japan .................. 63-229388

[51] Int. Cl.$^5$ ............. G01J 1/20; G03B 3/00
[52] U.S. Cl. .................. 250/201.7; 250/201.8
[58] Field of Search ............ 250/201.7, 201.8, 204; 354/408, 407

[56] References Cited

U.S. PATENT DOCUMENTS

| | | | |
|---|---|---|---|
| 4,552,445 | 11/1985 | Mukai et al. | 250/204 |
| 4,562,346 | 12/1985 | Hayashi et al. | 250/201.7 |
| 4,626,674 | 12/1986 | Oinoue | 250/201.8 |
| 4,716,434 | 12/1987 | Taniguchi et al. | 250/201.8 |
| 4,800,410 | 1/1989 | Akashi et al. | 250/201.7 |
| 4,851,657 | 7/1989 | Taniguchi et al. | 250/201.7 |
| 4,860,045 | 8/1989 | Hamada et al. | 250/204 |
| 4,862,204 | 8/1989 | Ishida et al. | 250/204 |
| 4,864,117 | 9/1989 | Ishida et al. | 250/201.8 |

*Primary Examiner*—David C. Nelms
*Assistant Examiner*—Michael Messinger
*Attorney, Agent, or Firm*—Oblon Spivak, McClelland, Maier & Neustadt

[57] ABSTRACT

A focus detecting device gathers first image data by a couple of linear arrays of photo diodes in a CCD, which are disposed oppositely with respect to an optical axis of an objective, and second image data by a couple of photo diodes arrayed disposed close to one of the photo diode arrays. A CPU calculates a integer part and fractional part of a displacement of first and second images represented by the first image data, and checks if the calculation results are reliable for focus detection, by using the first and second image data. A counter contained in the CPU counts the number of decisions of unreliable. When a count of counter reaches a preset value and when the latest decision of unreliability is made for the integer part calculation result, a subsequent lens drive is prohibited, and the integration by the CCD, and the integer part calculation are repeated, while presenting a display of "Unmeasurable". Further, an additional reliability check is made of the result of the latest integer part calculation. If the additional reliability check shows a satisfactory reliability, the CPU goes out of the repetitive operation of the integration and the integer part calculation, and removes the prohibition of the lens drive.

7 Claims, 6 Drawing Sheets

DEVICE AND METHOD FOR DETECTING A FOCUSING STATE WITH RELIABILITY CHECKING

BACKGROUND OF THE INVENTION

The present invention relates to a device and a method for detecting a focusing state of an objective by receiving light beams emitted from an object and passing through two portions of the objective that are disposed oppositely with respect to an optical axis of the objective.

Japanese Patent Application Laying Open (KOKAI) No.62-102213 discloses a focus detecting device. In the focus detecting device disclosed, a charge coupled device (CCD) receives first and second images as are formed by the light beams emitted from an object and passing through first and second portions of an objective or photographic lens that are oppositely disposed with respect to an optical axis of the objective. The focus detecting device calculates an integer part and a fractional part of a displacement of the first and second images one from the other by using the output signals of the CCD, and detects a displacement of the objective from its focal position.

In the integer part calculation, a distance between the first and the second images is worked out roughly or with relatively large pitches. In the fractional part calculation, the distance obtained by the integer part calculation is worked out precisely or with small pitches. The integer part calculation provides the interimage distance with relatively large pitches. Therefore, the resultant interimage distance will determine also the direction of the movement of the lens, and greatly influences a view through the finder. Accordingly, it is capable of reliably detecting the interimage distance of even an object whose distance is hard to measure. The integer part calculation being excellent in detecting the interimage distance sometimes loses its reliability. Such a case results from poor or no contrast of an object to be photographed. When an object of no contrast exists within a view of a finder, the focus detecting device is unable to measure a distance of the object, and repeats only the integration of the CCD and the integer part calculation. In such a situation, if an object of a high contrast suddenly enters the view of the finder, the focus detecting device operates to obtain an optimum focus through the ordinary distance measurement and lens drive.

There has been known another focus detecting device, called a single focus detecting device. In the above situation, viz., the object has no contrast and its distance cannot be measured, the single focus detecting device, unlike the focus detecting device of the gazette, will not operate until the release button is pushed again. Accordingly, an operator sometimes fails to shoot the object at good timing. Where an objective of a long focal distance is used, tremulous hands make it difficult to place an object within a measurable range. Further, when the object is a thing moving at a high speed, a high skill is required to trace the object within the measurable range.

SUMMARY OF THE INVENTION

Accordingly, an object of the present invention is to provide a device and a method for detecting a focusing state of an objective by receiving light beams emitted from an object and passing through two portions of the objective that are disposed oppositely with respect to an optical axis of the objective, which allow an operator to surely snap the shutter at his desired timing even if an object of a high contrast suddenly appears within the view of a finder when an object of no contrast exists within the view of the finder, and which in a case of using a objective of a long focal distance, is capable of reliably tracing an object that moves at a high speed within a measurable range, without any adverse effects by a tremor of the hands.

According to one aspect of the present invention, there is provided a focus detecting device which detects a displacement of an objective from an in-focus position by detecting relative positions of first and second images formed by light beams emitted from an object and passed through two portions of the objective oppositely disposed with respect to an optical axis of the objective, the focus detecting device comprising: first and second photo sensing means for receiving and converting the first and second images into first and second electrical signals; means for detecting a contrast of an image of the object to deliver a contrast signal; integer part calculating means for calculating an integer part of a displacement of the first and second images one from the other by using the electrical signals of the first and second photo sensing means; integer part reliability check means for checking if the integer part calculation result is reliable enough for focus detection, by using the electrical signals of the first and second photo sensing means and the contrast signal of the contrast detecting means; fractional part calculating means for calculating a fractional part of the displacement of the first and second images one from the other; fractional part reliability check means for checking if the fractional part calculation result is reliable enough for focus detection, by using the electrical signals of the first and second photo sensing means and the contrast signal of the contrast detecting means; count means for counting the number of decisions of unreliability made by the integer part reliability check means and the fractional part reliability check means; and control means for exercising such a control that when a count by the count means reaches a preset value and when the latest decision of unreliability is made for the integer part calculation result, a further lens drive is prohibited, and a converting operation by the first and second photo sensing means, a contrast detecting operation by the contrast detecting means, and an integer part calculating operation by the integer part calculating means are repeated, while presenting a display of "Unmeasurable", and an additional reliability check is made of the result of the latest integer part calculation, and if the additional reliability check shows a satisfactory reliability, control goes out of the repetition of the converting operation, contrast detecting operation and integer part calculating operation, and removes the prohibition of the lens drive.

According to another aspect of the present invention, there is provided a focus detecting method for detecting a displacement of an objective from an in-focus position by detecting relative positions of first and second images formed by light beams emitted from an object and passed through two portions of the objective oppositely disposed with respect to an optical axis of the objective, the focus detecting method comprising the steps of: receiving and converting the first and second images into first and second electrical signals; detecting a contrast of an image of the object to deliver a contrast signal; calculating an integer part of a displacement of the first and second images one from the other by using the electrical signals formed in the receiving and converting step; checking if the integer part calculation result is reliable enough for focus detection, by using the electrical signals formed in the receiving and converting step; calculating a fractional part of the displacement of the first and second images one from the other; checking if the fractional part calculation result is reliable enough for focus detection, by using the electrical signals formed in the receiving and converting step and the contrast signal formed in the contrast detecting step; counting the number of decisions of unreliability made by the integer part reliability checking step and the fractional part reliability checking step; and exercising such a control that when a count in the counting step reaches a preset value and when the latest decision of unreliability is made for the integer part calculation result, a further lens drive is prohibited, and the receiving and converting step, the contrast detecting step, and the integer part calculating step are repeated, while presenting a display of "Unmeasurable", and an additional reliability check is made of the result of the latest integer part calculation, and if the additional reliability check shows a satisfactory reliability, control goes out of the repetition of the receiving and converting step, contrast detecting step and integer part calculating step, and removes the prohibition of the lens drive.

With such arrangements, when an object of no contrast exists in a field of the view of the finder, an integration by the photo sensing means and the contrast detection by the contrast detecting means are repeated, while prohibiting the lens drive. At this time, if an object with good contrast suddenly appears, control goes out of the above repetitive processings, while at the same time removing the prohibition of lens drive. Therefore, an operator can surely shoot such a suddenly appearing object with good contract.

Further, where an objective of a long focal distance is used, the focus detecting device and method according to the present invention guarantees a sure tracing of an object that moves at high speed object within a measurable range without an adverse effect of a tremor of the hands.

Other objects, features, and advantages of the present invention will be apparent from the following description taken in connection with accompanying drawings, in which:

DESCRIPTION OF THE PREFERRED EMBODIMENTS

Figure 1:
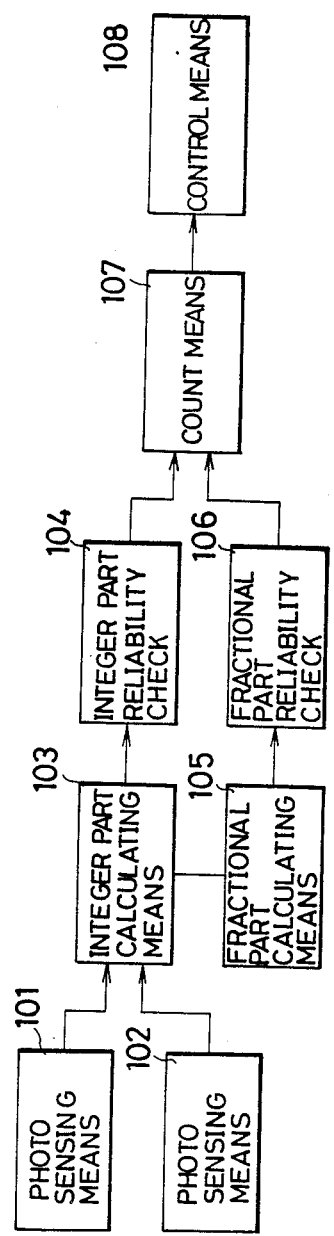
FIG. 1 is a block diagram showing a scheme of the present invention.

Reference is first made to FIG. 1 showing a scheme of the present invention. A couple of photo sensing means 101 and 102 contained in a charge coupled device, receive light beams emitted from an object. The light beams contain the information of first and second images. Then, the photo sensing means 101 and 102 produce video signals reflecting light intensity distribution patterns of those images. The video signals are applied to an integer part calculating means 103. The calculating means 103 calculates an integer part of a displacement of the first and second images one from the other. The calculation is conducted for every photo sensing element (one bit) of the CCD. The result of the integer part calculation is applied to an integer part reliability check means 104. The check means 104 checks if the calculation result is reliable enough to detect a focal point. The integer part calculating means 103 is followed by a fractional part calculating means 105. The calculating means 105 calculates a fractional part of the displacement. A fractional part reliability check means 106, coupled with the fractional part calculating means 105, checks a reliability of the calculating result derived from the calculating means 105. A count means 107 is provided for counting the number of decisions of unreliability made by the reliability check means 104 and 106. A control means 108 following the count means 107 exercises the following controls. When a count of the count means 107 reaches a predetermined value, and the latest decision of unreliability is made by the integer part reliability check means 104, the control means 108 prohibits a subsequent lens drive, and causes the photo sensing means 101 and 102 to repeat their integration and the integer part calculating means 103 to repeat its calculation. At the same time, the control means 108 provides a visual presentation of "Unmeasurable". Further, it checks as to whether the reliability of the calculation result derived from the calculating means 103 is good or no good. This reliability check is apart from the reliability check by the reliability check means 104 and 106. If the reliability is good, control goes out of a loop of repeating the integration and the integer part calculation, and removes the prohibition of the lens drive.

Figure 2:
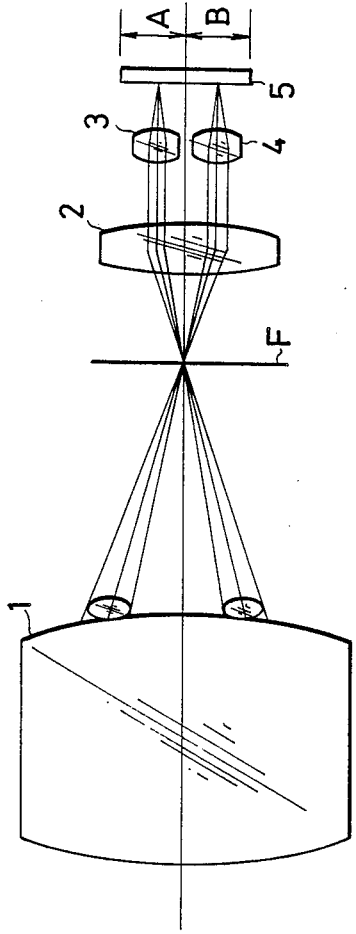
FIG. 2 is an explanatory diagram useful in explaining optical system used in an embodiment of a focus detecting device according to the present invention.

An optical system in the focus detecting device is illustrated in FIG. 2. In the figure, reference numeral 1 designates an objective; F, a plane corresponding to a film plane; 2 a condensor lens; 3 and 4 ocular lenses; 5 a CCD; A and B upper and lower photo sensor arrays. Light beams emitted from an object (not shown), enters the objective 1. The light beams passed through first and second portions of the objective 1, that are oppositely disposed with respect to an optical axis of the objective 1, pass through the condenser lens 2 and a pair of ocular lenses 3 and 4, and finally form the first and second images on the upper and lower side sensor arrays A and B.

Figure 3:
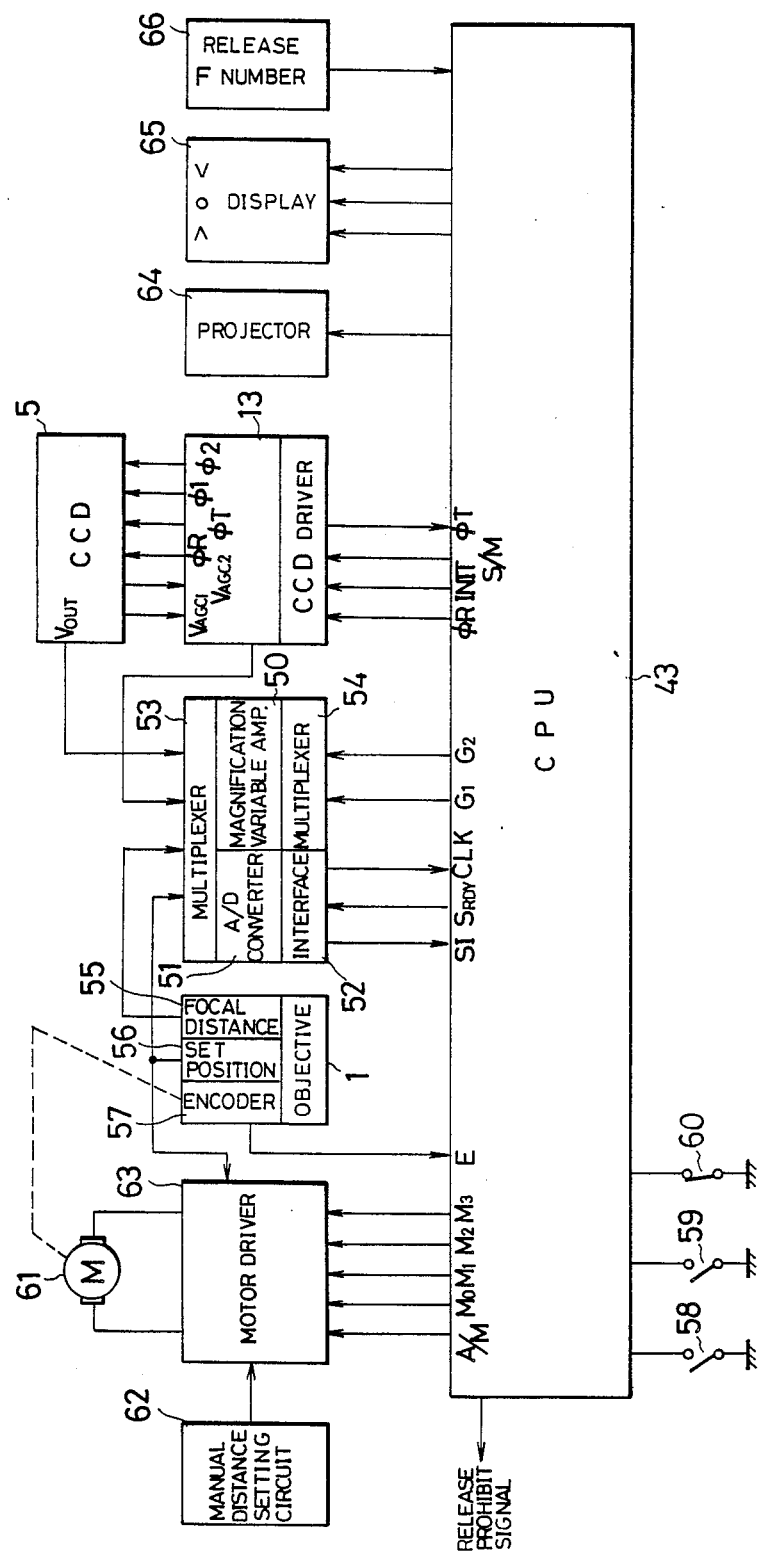
FIG. 3 shows in block form an electrical system used in the device and method for detecting a focusing state according to the present invention.

An electrical configuration used in a device and method for detecting a focusing state of the objective 1 according to the present invention is illustrated in FIG. 3.

Figure 4:
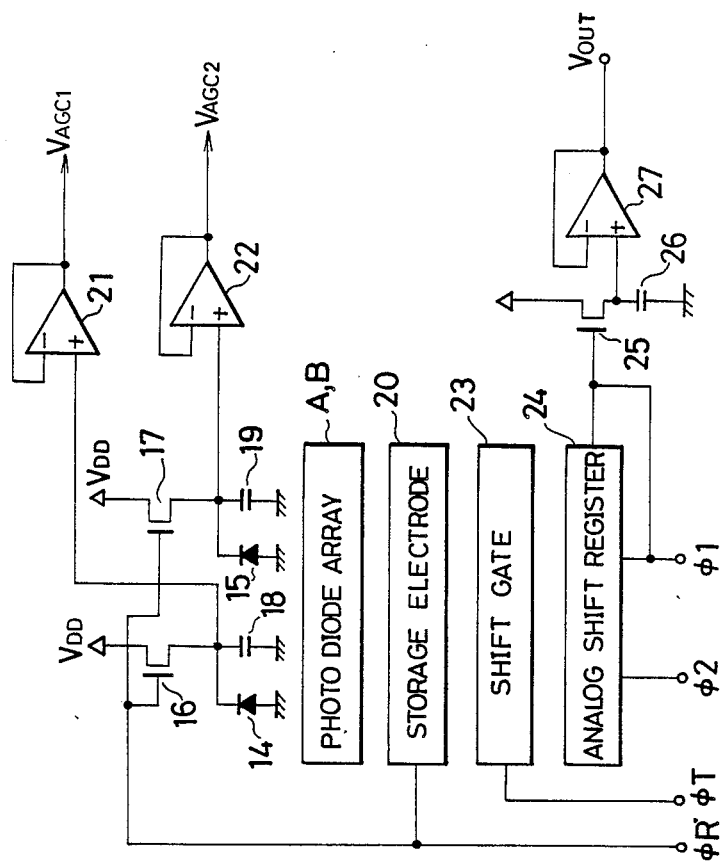
FIG. 4 shows a circuit arrangement of a CCD (charge coupled device) used in the electrical system of FIG. 3.

A charge coupled device (CCD) 5 as the photo sensitive means 101 and 102, which is contained in the circuit of FIG. 3, will first be described in detail with reference to FIG. 4. As shown, a couple of linear arrays of photo diodes A and B are disposed one upon the other with respect to the optical axis of the photographic lens 1 (FIG. 2). A couple of monitor photo diodes 14 and 15 are disposed in parallel with and adjacent to one of the diode arrays A and B. When a reset pulse signal φR from a driver 13 (FIG. 3) goes high in logic level, field effect transistors (FETs) 16 and 17 are turned on to respectively form electrical paths containing capacitors 18 and 19 between a power source VDD and ground. The capacitors 18 and 19 are charged through the electrical paths. Further, a storage electrode 20 is reset. When the reset pulse signal φR goes low in logic level, photo currents, which depend on a luminance distribution, flow through the photo diode arrays A and B. Then, charges are stored into the storage electrode 20. At this time, a photo current, which depends on the luminance distribution, also flows through the monitor photo diodes 14 and 15. Accordingly, the potentials across the capacitors 18 and 19 drop. The potentials across those capacitors 18 and 19 are applied through buffer amplifiers 21 and 22 to the driver 13. When receiving a transfer pulse signal φT from the driver 13, a shift gate 23 is enabled, so that the charge stored in the storage electrode 20 is transferred to an analog shift register 24. In response to pulse signals φ1 and φ2 derived from the driver 13, the charge is successively shifted and outputted in the form of a video signal VOUT, through a path consisting of a route of an FET 25, capacitor 26 and buffer amplifier 27.

Figure 5:
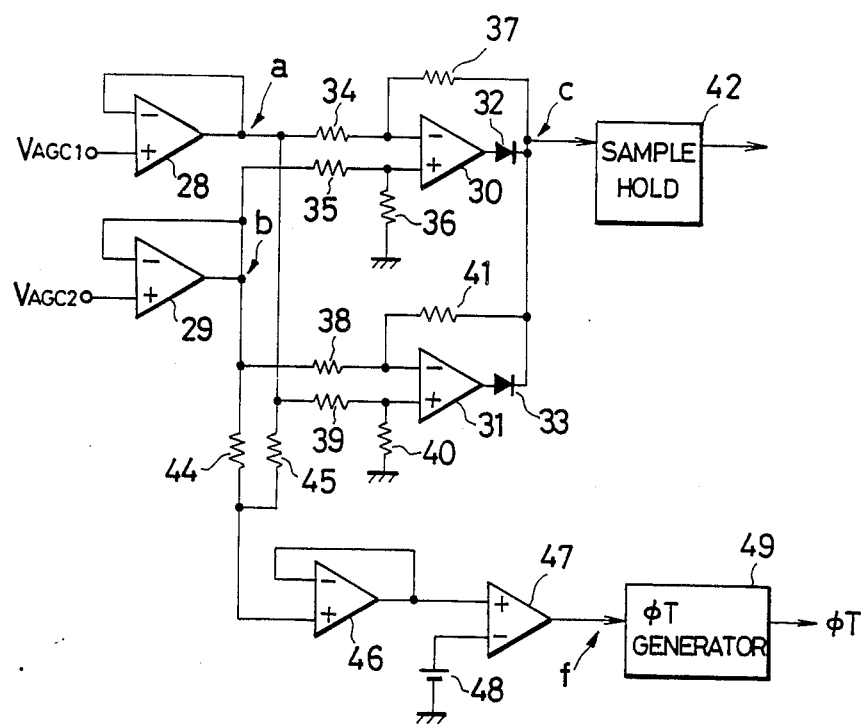
FIG. 5 shows a circuit diagram of a driver for driving the CCD used in the electrical system of FIG. 3.

A specific circuit of the driver 13 is arranged as shown in FIG. 5. The output signals VAGC1 and VAGC2 from buffer amplifiers 21 and 22 in the CCD 5 (FIG. 4) are received by buffer amplifiers 28 and 29 of the driver 13. These signals are then applied to an absolute amplifier made up of operational amplifier 30, diodes 32 and 33, and resistors 34 to 41. The absolute amplifier produces an absolute value of the difference between the signals VAGC1 and VAGC2. The difference signal is sampled and held by a sample/hold circuit 42. Specifically, when a predetermined time, e.g., 10 ms, elapses after the reset pulse signal φR goes low and the CCD 5 starts an integration operation (charge storing operation by the storage electrode 20 and discharging operation of the capacitors 18 and 19), a focus control microcomputer (CPU) 43 (FIG. 3) produces a sample/hold pulse signal, which in turn is applied to the sample/hold circuit 42. Responsive to the sample/hold pulse signal, the circuit 42 starts the sample/hold operation.

The output signals of the buffer amplifiers 28 and 29 are added together by resistors 44 and 45, and passes through a buffer amplifier 46 and reaches a comparator 47. The comparator 47 compares the received signal with a reference voltage derived from a reference voltage source 48. When the output signal of the buffer amplifier 46 is equal to the reference voltage, a φT generator 49 produces a transfer pulse signal φT for transmission to the CCD 5.

Figure 6:
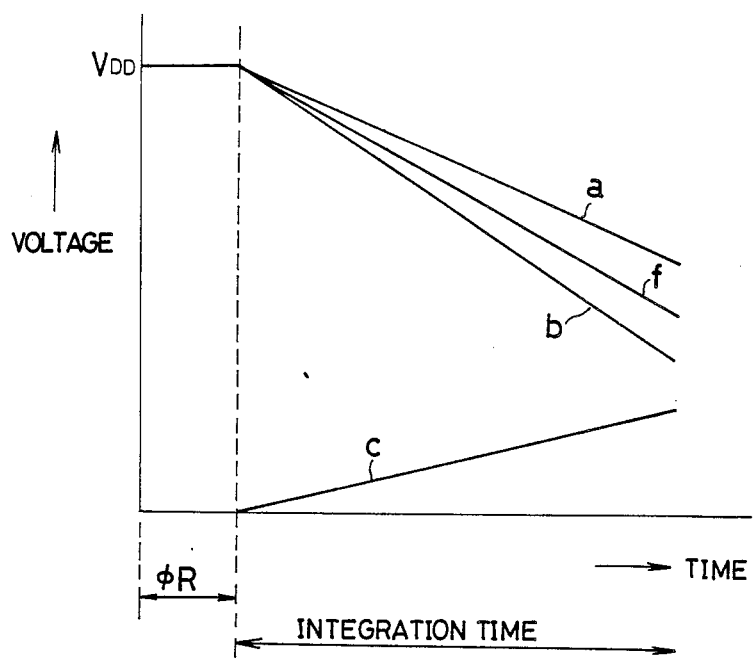
FIG. 6 graphically represents variations of signals at key points in the driver of FIG. 5.

Turning now to FIG. 6, there is shown a graph showing variations of the output signals "a" and "b" of the buffer amplifiers 28 and 29, the output signal "f" of the comparator 47, and the output signal "c" of the absolute amplifier. The signals "a", "b" and "f" decline with time at inclinations dependent on the amounts of light received by the monitor photo diodes 14 and 15. The signal "c" rises with time at an inclination dependent on the absolute value of the difference between the amounts of lights received by the monitor photo diodes 14 and 15, viz., a contrast of the object image.

Returning to FIG. 3, the video signal VOUT of the buffer amplifier 27 in the CCD 5 is applied through a multiplexer 53 to magnification variable amplifier 50. The output signal of the amplifier 50 is then applied to a analog to digital (A/D) converter 51 where it is converted into a digital signal. The digital signal is inputted through an interface 52 to the CPU 43.

The output signal of the sample/hold circuit 42 in the driver 13 is applied through the multiplexer 53 to the A/D converter 51 where it is digitized. The digital signal is then inputted through the interface 52 to the CPU 43.

Before fetching the video signal from the CCD 5, the CPU 43 adjusts a gain of the magnification variable amplifier 50 through the multiplexer 54 in accordance with the output signal of the sample/hold circuit 42. Accordingly, the amplifier 50 amplifiers the video signal from the CCD 5 in accordance with the contrast of the object image. The CPU 43 fetches the video signal containing the contrast information, and therefore can calculate a defocus quantity with a high precision.

A focal distance Fφ and a set position Siφ of the objective 1 are detected by detectors 55 and 56. The output signals of the detectors 55 and 56 are applied to the CPU 43, through the multiplexer 53, A/D converter 51, and interface 52. A pulse signal from an encoder 57 and signals from switches 58 to 60 are also applied to the CPU 43.

The encoder 57 constitutes a detector for detecting the rotation of a motor 61 for driving the photographic lens 1. The switch 58 selects either of automatic focusing modes, auto mode or manual mode. The switch 59 is a power switch as a release switch which is turned on when a release button is pushed, and causes the automatic focusing operation. The switch 60 is set modes to constants A1 to A3 that is used for calculating a defocus quantity.

A manual distance setting circuit 62 generates a signal to drive the motor 61 manually. When an auto mode is set up by the switch 58, the CPU 43 feeds a defocus quantity Df2 to a motor driver 63, which in turn drives the motor 61 by the quantity Df2. When a manual mode is set up by the switch 58, the CPU 43 causes the motor driver 63 to turn the motor 61 by the output signal of the manual distance setting circuit 62. When an object is dark, the CPU 43 drives a projector 64 to supplementally project the object. A display unit 65 displays infocus, front, behind, and unmeasurable. A release F-number of the photographic lens 1 is derived from an F-number circuit 66. The F-number is used for the calculation of a defocus quantity DF2.

Figure 7:
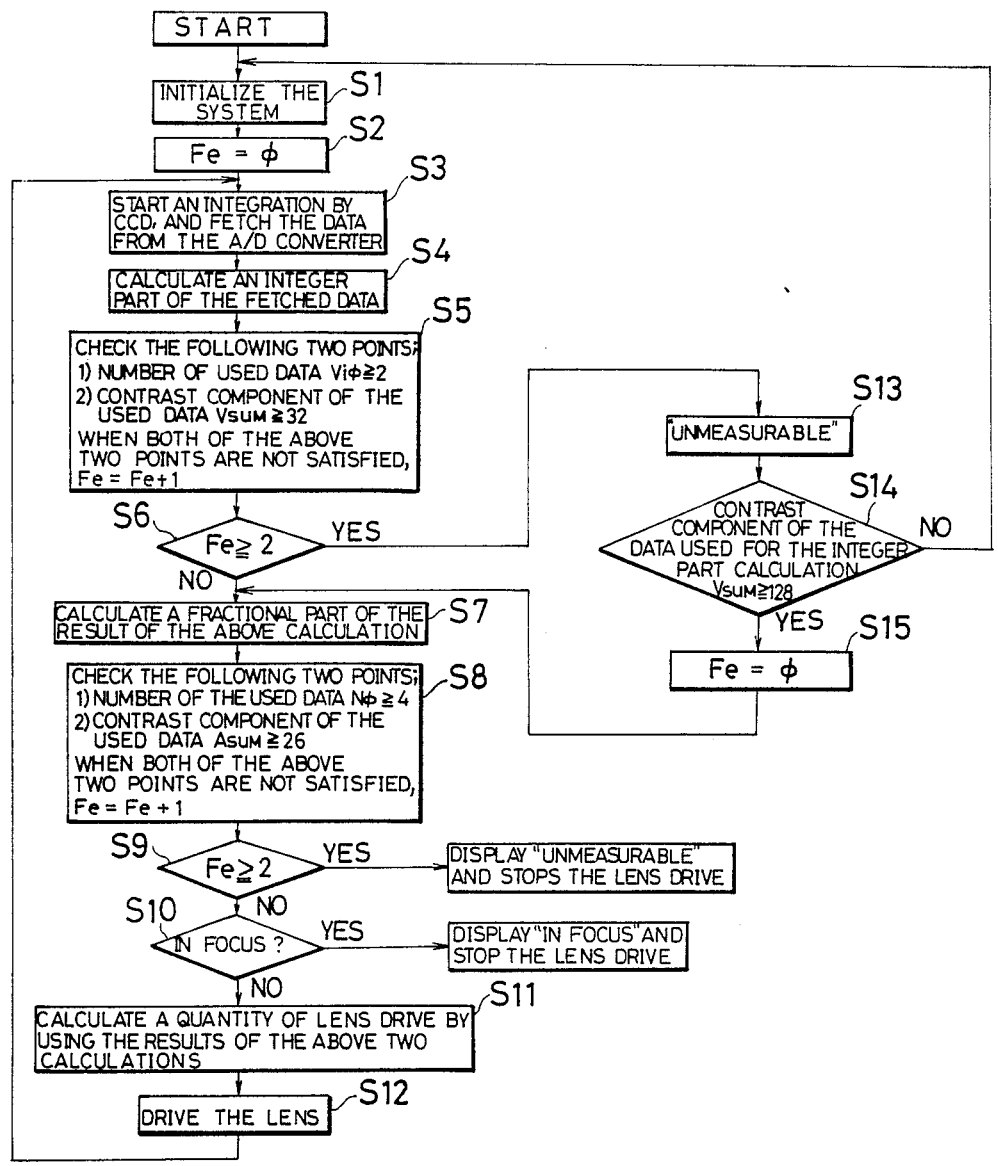
FIG. 7 is a flowchart showing a flow of controls for detecting a focusing state of the objective according to the present invention.

How the CPU 43 controls the hardware system of the focus detecting device thus arranged will be with reference to FIG. 7.

To start the CPU 43, the switch 59 is operated. In step S1, the CPU initializes the related portions in the focus detecting device. In step S2, it resets the counter Fe that corresponds to the count means 107 (FIG. 1) and is contained in the CPU 43 per se. In step S3, the CPU 43 causes the CCD 5 to start an integrating operation, and starts to fetch data from A/D converter 51. In step S4, the CPU 43 calculates an integer part of a displacement quantity existing between images sensed by the sensor arrays A and B, by using the data from the A/D converter 51. The calculation is performed for each photo sensing element (one bit) of the CCD 5. In step S5, the CPU 43 checks whether or not the result of the integer part calculation is reliable enough to detect a focal point. When deciding that the reliability of the calculation result is no good, the CPU 43 counts up the counter Fe. For the reliability check, the following two points are checked; (1) the number $Vi\phi$ of data used for the integer part calculation is 2 or more, and (2) the contrast component $V_{sum}$ of that data exceeds a predetermined value, 32, in this instance.

Assuming a series of obtained data to be $a_i (i=1, 2—N)$ and used data to be, for example, $(a_1, a_2)$, $(a_7, a_8)$ and $(a_{11}, a_{12})$, the contrast component $V_{sum}$ can be determined by the following equation:

$$V_{sum} = |a_1 31 a_2| + |a_7 - a_8| + |a_{11} - a_{12}|$$

If either of these points is satisfied, the CPU 43 decides that the reliability is good, viz., the integer part calculation result is reliable for the focus point detection. If both of them are not satisfied, the CPU 43 decides that the reliability is no good. In step S6, the CPU 43 checks if the count of the counter Fe is 2 or more. If the answer is NO, the CPU 43 goes to step S7. In the step S7, the CPU 43 calculates a fractional part of the displacement quantity between the images on the sensor arrays A and B. In the next step S8, the CPU 43 checks if the result of the fractional part calculation is reliable for detecting a focal point by using the result of the integer part calculation whose reliability is good. If the CPU 43 decides that the reliability of the fractional part calculation result is no good, it counts up the counter Fe. For this reliability check, the following two points are checked; (1) the number $N\phi$ of data used for the fractional part calculation is 4 or more, and (2) the contrast component $A_{sum}$ of that data exceeds a predetermined value, 26, in this instance.

Assuming a series of obtained data to be $b_i (i=1, 2,—N)$ and used data to be, for example, $(b_1, b_2)$, $(b_7, b_8)$ and $(b_{11}, b_{12})$, the contrast component $A_{sum}$ can be determined by the following equation:

$$A_{sum} = |b_1 - b_2| + |b_7 - b_8| + |b_{11} - b_{12}|$$

If either of these points is satisfied, the CPU 43 decides that the reliability is good, viz., the fractional part calculation result is reliable for the focus point detection. If both of them are not satisfied, the CPU 43 decides that the reliability is no good. Then, the CPU 43 advances to step S9, and checks if the count of the counter Fe is 2 or more. If the answer is YES, the CPU 43 displays "Unmeasurable" by the display unit 65, and stops the motor drive while displaying "unmeasurable." If the answer is NO, the CPU 43 proceeds to step S10 and checks whether or not the objective is in focus, by using the fractional part calculation result. If the answer is YES, viz., the objective 1 is in focus, the CPU 43 causes the display unit 65 to display "In focus" and stops the drive of photographic lens 1. If the answer is NO, the CPU 43 goes to step S11. In this step, the CPU 43 calculates a drive quantity of the photographic lens 1 by using the calculation results of the integer and fractional parts of the displacement quantity. Then, it executes step S12. In this step, the lens 1 is driven by the calculated quantity of lens drive. After completion of the lens drive, the CPU returns to step S3.

In step S6, if the answer is YES, viz., the count of the count Fe is at least 2, the CPU jumps to step S13. Here, the display unit 65 displays 37 Unmeasurable". Then, it goes to step S14. In this step, the CPU 43 checks if the contrast component $V_{sum}$ of the data used in the latest integer part calculation is at least a predetermined value, 128, in this instance.

In the step 14, the predetermined value of $V_{sum}$ is set to be larger than the predetermined value of $V_{sum}$ to be used in step 5, for the reason that a larger threshold value for shifting from prohibition of the lens drive to release of the prohibition is effective for preventing the lens from being unnecessarily driven.

By the check, the CPU 43 decides whether the result of the latest integer part calculation is reliable or not. If the answer is NO, viz., $V_{sum} > 128$, the CPU 43 decides that the reliability of that calculation result is no good, and returns to step S1. If the answer is YES, the CPU 43 decides that the reliability is good, and advances to step S15. In the step, the CPU 43 resets the counter Fe, and jumps to step S7.

As described above, if step S9 shows the "Unmeasurable", the conventional focus detecting device stops the lens drive and becomes standstill until the release button is pushed. In the instant embodiment, however, the CPU counts by its counter the number of decisions of no good reliability in the steps of checking the reliability of the results of the integer part calculation and the fractional part calculation. If the following two conditions are satisfied; (1) a count of the counter reaches a predetermined value, and (2) in the reliability check steps of checking the calculation results of the integer and fractional parts, the CPU 43 decides that the result of the latest calculation of the integer part is unreliable, the CPU 43 prohibits the subsequent lens drive, and causes the focus detecting device to repeat the integration by the CCD 5 and the calculation of the integer part, and causes the display unit 65 to display "Unmeasurable". In other words, the CPU 43 repeatedly executes steps S1 to S6, S13 and S14. Aside from the reliability checks of the integer part and fractional part, the CPU 43 executes the job of step S14 to check whether the result of the integer part calculation is reliable or not. If the calculation result is reliable enough to detect a focal point, the CPU 43 goes out of the processing loop of steps S1 to S6, S13 and S14, and removes the prohibition of the lens drive.

Accordingly, when an object with no contrast is being within a view of a finder, the CPU 43 repeatedly executes the loop of step S1 to step S6, S13 and S14. At this time, if an object with good contrast suddenly enters the view of the photographic lens 1, the CPU 43 goes out of the above loop of processings, while at the same time removes the prohibition of lens drive. Therefore, an operator can reliably shoot the suddenly appearing object with good contract.

Where an objective of a long focal distance is used, if a tremor of the hands occurs or a high speed object suddenly appears, it is possible to surely shoot the object at good timing.

Many widely different embodiments of the present invention may be constructed without departing from the spirit and scope of the present invention. It should be understood that the present invention is not limited to the specific embodiments described in the specification, except as defined in the appended claims.

WHAT IS CLAIMED IS:

1. A device for detecting a focusing state of an objective by receiving light beams emitted from an object and passing through first and second portions of the objective that are disposed oppositely with respect to an optical axis of the objective, said device comprising:

first and second photo sensing means for receiving and converting first and second images formed respectively by light beams passed through said first and second portions into first and second electrical signals;

integer part calculating means for calculating an integer part of a displacement of said first and second images one from the other by using the electrical signals from said first and second photo sensing means;

integer part reliability check means for checking if the integer part calculation result is reliable enough for focus detection, by using the electrical signals from said first and second photo sensing means;

fractional part calculating means for calculating a fractional part of said displacement of said first and second images one from the other;

fractional part reliability check means for checking if the fractional part calculation result is reliable enough for focus detection, by using the electrical signals from said first and second photo sensing means;

count means for counting the number of decisions of unreliability made by said integer part reliability check means and said fractional part reliability check means;

an additional reliability check means for checking if the latest integer part calculation result is reliable enough for focus detection, by using the electrical signals from said first and second photo sensing means; and control means for executing such a control that when a count by said count means reaches a preset value, and when the latest decision of unreliability is made for the integer part calculation result, a subsequent lens drive is prohibited, and the receiving and converting operation by said first and second photo sensing means and the integer part calculating operation by said integer part calculating means are repeated, while presenting a display of "Unmeasurable", and that when a decision of reliability is made for the integer part calculation result by said additional reliability check means, said control goes out of said repetition of the receiving and converting operation and the integer part calculating operation, and removes the prohibition of the lens drive.

2. A focus detecting device according to claim 1, in which said integer part reliability check means and said fractional part reliability check means respectively perform the reliability checks on the basis of the two facts; the number of data used for the calculations of the integer part and the fractional part, and contrast components contained in data used for the calculation.

3. A focus detecting device according to claim 1, in which said first and second photo sensing means are linear arrays of photo diodes.

4. A focus detecting device according to claim 3, in which said integer part calculation is conducted every data corresponding to one photo diode.

5. A method for detecting a focusing state of an objective by receiving light beams emitted from an object and passing through first and second portions of the objective that are disposed oppositely with respect to an optical axis of the objective, said method comprising the steps of:

receiving and converting first and second images formed respectively by light beams passed through said first and second portions into first and second electrical signals;

calculating an integer part of a displacement of said first and second images one from the other by using the electrical signals formed in said receiving and converting step;

checking if the integer part calculation result is reliable enough for focus detection, by using the electrical signals formed in said receiving and converting step;

calculating a fractional part of said displacement of said first and second images one from the other;

checking if the fractional part calculation result is reliable enough for focus detection, by using the electrical signals formed in said receiving and converting step;

counting the number of decisions of unreliability made by said integer part reliability checking step and said fractional part reliability checking step;

checking additionally if the latest integer part calculation result is reliable enough for focus detection, by using the electrical signals formed in said receiving and converting step; and executing such a control that when a count in said counting step reaches a preset value, and when the latest decision of unreliability is made for the integer part calculation result, a subsequent lens drive is prohibited, and the receiving and converting step and integer part calculating step are repeated, while presenting a display of "Unmeasurable", and that when a decision of reliability is made for the integer part calculation result in said additionally checking step, said control goes out of said repetition of the receiving and converting step and the integer part calculating step, and removes the prohibition of the lens drive.

6. A focus detecting method according to claim 5, in which the reliability checks in said integer part reliability checking step and said fractional part reliability checking step are respectively made on the basis of the two facts; the number of data used for the calculation of the integer part and the fractional part, and contrast components contained in data used for the calculation.

7. A focus detecting method according to claim 5, in which the reliability check of said integer part calculation result in said additional reliability checking step is made based on the fact that contrast components contained in data used for the calculation in the integer part calculating step is greater than a predetermined value which is set to be greater than a value preset for the reliability check in said integer part reliability checking step.

* * * * *